United States Patent [19]
Frick et al.

[11] Patent Number: 6,104,870
[45] Date of Patent: Aug. 15, 2000

[54] METHOD AND SYSTEM FOR IMPROVING COMMUNICATIONS IN DATA COMMUNICATIONS NETWORKS THAT PROVIDE NETWORK EMULATION

[75] Inventors: John Kevin Frick, Raleigh; John Edward Dickey, Cary; John Lloyd, Durham; Deepak Vig, Raleigh; Edward Joel Rovner, Chapel Hill, all of N.C.

[73] Assignee: International Business Machines Corporation, Armonk, N.Y.

[21] Appl. No.: 09/109,143

[22] Filed: Jul. 2, 1998

[51] Int. Cl.[7] ........................................ G06F 9/455
[52] U.S. Cl. ............................... 395/500.48; 395/500.42; 370/395; 370/386; 370/401
[58] Field of Search .................. 395/500.44, 500.46, 395/500.47, 500.48; 370/216, 395, 236, 401, 386

[56] References Cited

U.S. PATENT DOCUMENTS

| | | | |
|---|---|---|---|
| 5,422,878 | 6/1995 | Kimoto et al. | 370/60 |
| 5,577,033 | 11/1996 | Chang et al. | 370/60 |
| 5,581,552 | 12/1996 | Civanlar et al. | 370/396 |
| 5,583,862 | 12/1996 | Callon | 370/397 |
| 5,596,579 | 1/1997 | Yasrebi | 395/678 |
| 5,596,723 | 1/1997 | Romohr | 395/200.16 |
| 5,600,644 | 2/1997 | Chang et al. | 370/404 |
| 5,649,091 | 7/1997 | Ould-Ali et al. | 395/182.09 |
| 5,715,250 | 2/1998 | Watanabe | 370/395 |
| 5,774,695 | 6/1998 | Autrey et al. | 395/500 |
| 5,835,481 | 11/1998 | Akyol et al. | 370/216 |
| 5,936,936 | 8/1999 | Alexander et al. | 370/216 |

FOREIGN PATENT DOCUMENTS

| | | |
|---|---|---|
| 8-274802 | 10/1996 | Japan . |
| 8-274815 | 10/1996 | Japan . |
| 9-331152 | 12/1996 | Japan . |
| 9-205455 | 8/1997 | Japan . |
| 9-233094 | 9/1997 | Japan . |
| WO 96/06492 | 2/1996 | WIPO ............................ H04L 12/66 |
| WO 96/29807 | 9/1996 | WIPO ............................ H04L 12/66 |

OTHER PUBLICATIONS

IBM Technical Diclosure Bulletin, vol. 39, No. 08, Aug. 1996, Method for Improving Network Availability with Redundant Network Servers.

*Primary Examiner*—Kevin J. Teska
*Assistant Examiner*—Thai Phan
*Attorney, Agent, or Firm*—Gerald R. Woods; Felsman, Bradley, Vaden, Gunther & Dillon, LLP

[57] ABSTRACT

A method and system for improving communications in data communications networks which provide network emulation. The method and system accomplish their objects via communications equipment adapted to do the following: implant a number of distributed-redundant gateways in an emulated network; and dynamically assign access to operational distributed-redundant gateways. In one embodiment, the network emulation is an Asynchronous Transfer Mode Emulation Local Area Network (ATM ELAN), and the distributed-redundant gateways operate as default Internet Protocol (IP) gateway utilized by LAN Emulation Clients (LE Clients) of the ATM ELAN. Also in one embodiment, the dynamic assignment of access is done such that the data communications loading associated with the default IP gateway is distributed throughout a data communications network.

20 Claims, 7 Drawing Sheets

METHOD AND SYSTEM FOR IMPROVING COMMUNICATIONS IN DATA COMMUNICATIONS NETWORKS THAT PROVIDE NETWORK EMULATION

BACKGROUND OF THE INVENTION

1. Technical Field

The present invention relates generally to transmitting data over emulated local area networks (ELANS) using Internet Protocol (IP), where the ELANs are implemented on an asynchronous transfer mode (ATM) network. More specifically, the present invention relates to creating distributed-redundant gateways for the ELANS.

2. Description of the Related Art

Due to the widespread acceptance of the current IP standard for communicating data, this standard has been adapted for use with ATM devices. Currently, one standard solution for sending IP traffic over an ATM interface is specified by the Internet Engineering Task Force (IETF) and is described by M. Laubach in a document entitled "Classical IP and ARP over ATM," RFC 1577, Hewlett Packard Laboratories, January 1994. Also, due to the large installed base of traditional local area network (LAN) products, standards have been created which allow existing LAN applications to communicate data over ATM networks. See ATM Forum "LAN Emulation over ATM: Version 1.0 Specification," AF-LANE-0021.000, January 1995.

A problem existing with today's ELANs which use IP is the lack of flexible backup gateways. In current systems, end stations attached to a router via LAN emulation (LANE) can either run a routing protocol to determine the next hop for packets destined for subnets not directly connected to the end station, or the system administrator can specify the next hop by configuring a default gateway. The system administrator can configure a default gateway on the end station by specifying the IP address of a router interface on the ELAN. If the system administrator has configured a default gateway and the default gateway's interface is down, the end station will not be able to forward packets out of its own subnet. Furthermore, if many stations are simultaneously attempting to access the default gateway, data traffic congestion at the default gateway is likely.

Therefore, it is apparent that a need exists for a method and system which provide multiple operational distributed-redundant gateways which will automatically assume responsibility for gateway functions in the event that one or more distributed-redundant gateways become inoperational. It is also apparent that a further need exists for the method and system to dynamically distribute loading across the operational distributed-redundant gateways such that data traffic congestion is decreased.

SUMMARY OF THE INVENTION

It is therefore one object of the present invention to provide a method and system which provide multiple operational distributed-redundant gateways which will automatically assume responsibility for gateway functions in the event that one or more distributed-redundant gateways become inoperational.

It is yet another object of the present invention to provide a method and system which provide multiple operational distributed-redundant gateways which will automatically assume responsibility for gateway functions in the event that one or more distributed-redundant gateways become inoperational, and which dynamically distribute loading across operational distributed-redundant gateways such that data traffic congestion is decreased.

The method and system accomplish their objects via communications equipment adapted to do the following: implant a number of distributed-redundant gateways in an emulated network; and dynamically assign access to operational distributed-redundant gateways. In one embodiment, the network emulation is an Asynchronous Transfer Mode Emulation Local Area Network (ATM ELAN), and the distributed-redundant gateways operate as a default Internet Protocol (IP) gateway utilized by LAN Emulation Clients (LE Clients) of the ATM ELAN. Also in one embodiment, the dynamic assignment of access is done such that the data communications loading of the associated default IP gateway is distributed throughout a data communications network.

The above, as well as additional objects, features, and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
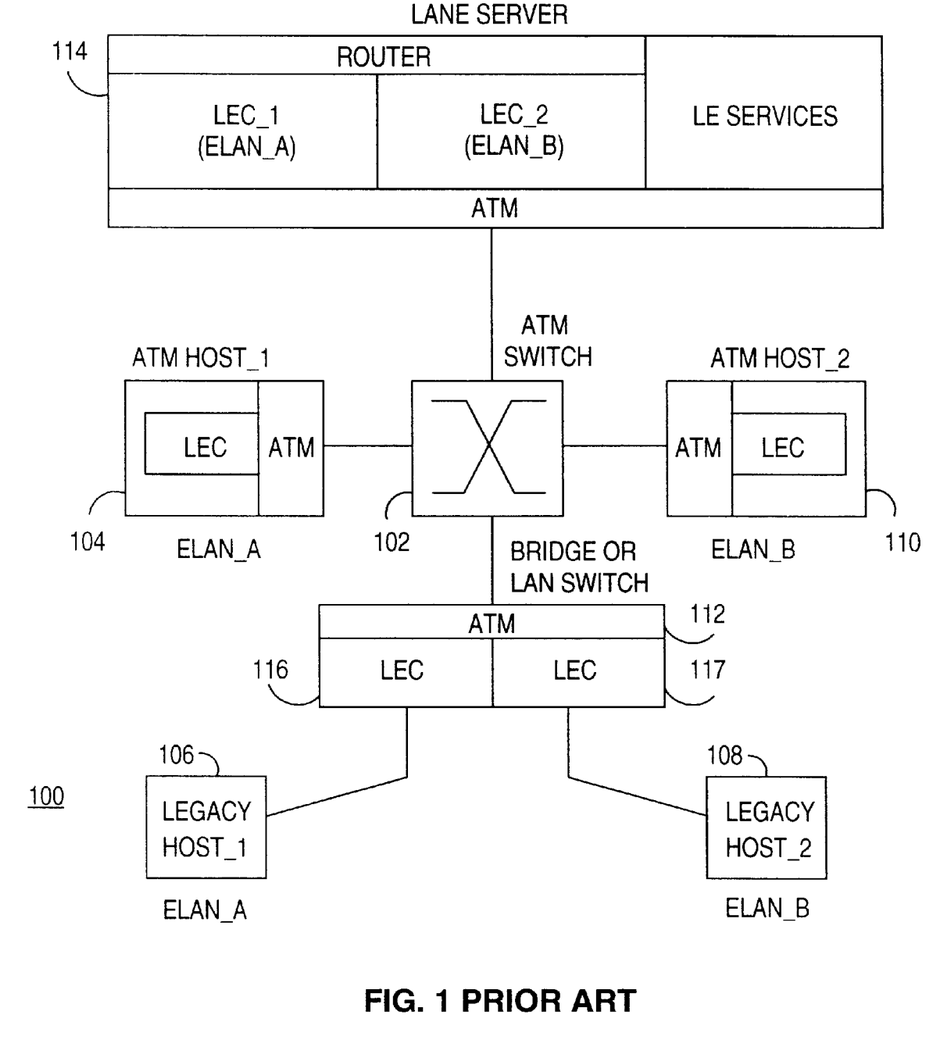
FIG. 1 illustrates the physical connections of an asynchronous transfer mode network having an emulated local area network (ELAN)

FIG. 1 illustrates a prior art asynchronous transfer mode (ATM) network 100 having an emulated local area network (ELAN). Attached to ATM switch 102 are: router 114, ATM host 104, ATM host 110, and LAN switch 112. ATM host 104 is an ATM device which has been configured to reside on ELAN-A. ATM host 110 is another ATM device which has been configured to reside on ELAN B. LAN switch 112 contains an ATM interface and proxy LAN emulation clients (LECs) 116 and 117. Proxy LECs 116 and 117 are associated with ELAN-A and ELAN-B, respectively, and bridge communications from legacy hosts 106 and 108 to their respective ELANS. Legacy hosts 106 and 108 are traditional LAN devices which communicate with ATM switch 102 through proxy LECs 116 and 117. Router 114 performs many services for ATM switch 102. One of the services provided by router 114 is routing traffic from ELAN-A to ELAN-B and vice versa.

Figure 2:
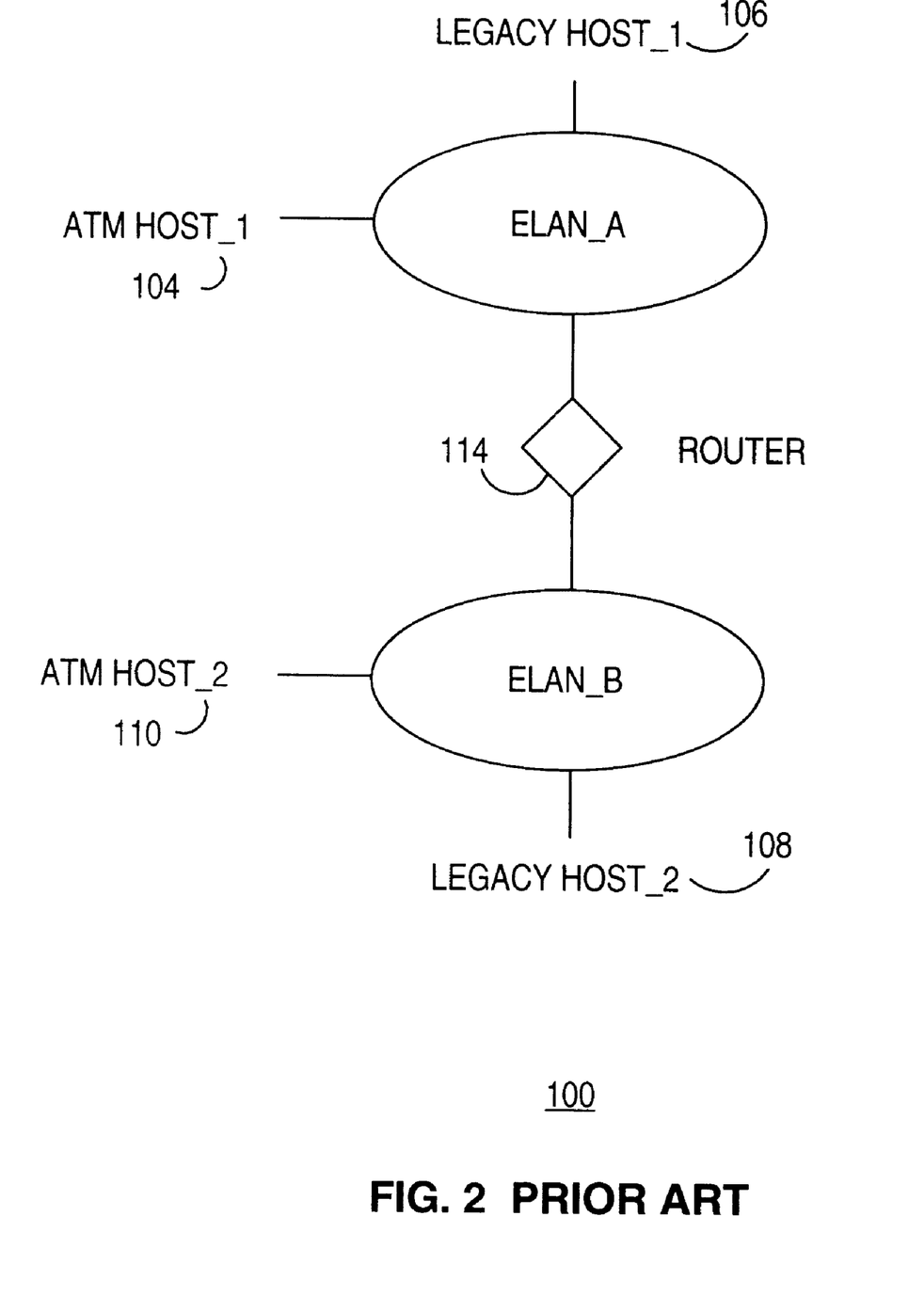
FIG. 2 depicts the logical connections of the network shown in FIG. 1.

FIG. 2 illustrates the logical connections of the network 100 shown in FIG. 1. Attached to ELAN-A are ATM host 104 and legacy host 106. Likewise, attached to ELAN-B are ATM host 110 and legacy host 108. Routing traffic between ELAN-A and ELAN-B is router 114.

Figure 3:
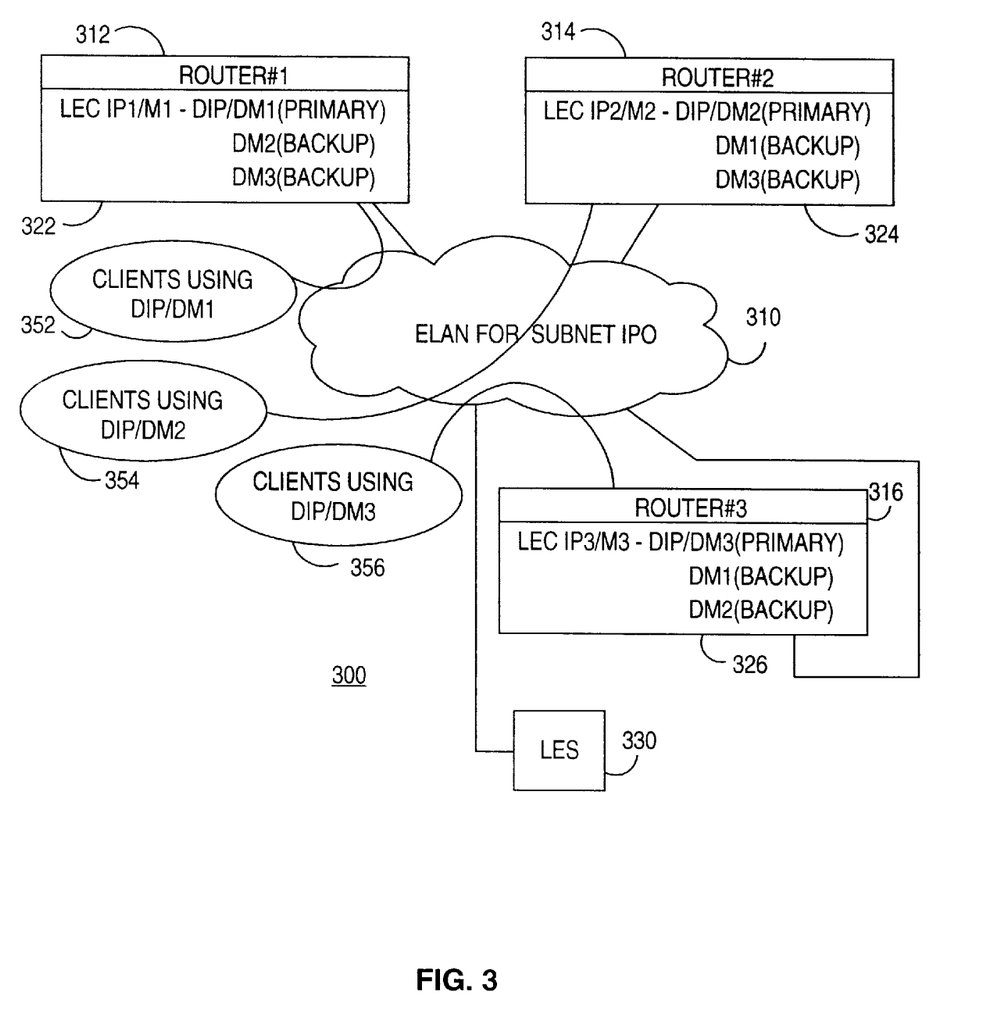
FIG. 3 depicts an environment wherein is contained one embodiment of the present invention whereby IP gateway functions are distributed.

Refer now to FIG. 3. FIG. 3 depicts an environment wherein is contained one embodiment of the present invention whereby Internet Protocol (IP) gateway functions are distributed. Shown in FIG. 3 is network 300. Contained within network 300 are three routers: Router #1 312, Router #2 314, and Router #3 316, each containing LEC #1 322, LEC #2 324, and LEC #3 326, respectively. LEC #1 322, LEC #2 324, and LEC #3 326 are connected to ELAN 310 for a single defined subnet IP0.

Router #1 312 has IP address IP1, Router #2 314 has IP address IP2, and Router #3 316 has IP address IP3. Accordingly, shown is that LEC #1 322 has been assigned Medium Access Control (MAC) address M1 correspondent to IP1, LEC #2 324 has been assigned MAC address M2 correspondent to IP2, and LEC #3 326 has been assigned MAC address M3 correspondent to IP3. Router #1 312, Router #2 314, and Router #3 316 use the LEC address pairings IP1/M1, IP2/M2, and IP3/M3, respectively, for all ordinary transmission of data into and out of ELAN specifically addressed to or from IP addresses IP1, IP2, and IP3, respectively. For example, OSPF running on a router connected to ELAN 310 uses IP1, IP2, and IP3 to communicate with Router #1 312, Router #2 314, and Router #3 316, respectively.

In addition to the foregoing IP/MAC address pairings which are those necessary for ordinary communications with IP1, IP2, and IP3, also shown are auxiliary IP/MAC address pairing resident within LEC #1 322, LEC #2 324, and LEC #3 326. In one embodiment of the present invention these auxiliary IP/MAC pairings provide/constitute what are known as distributed-redundant gateways (DRGs). In order to provide a first DRG, LEC #1 322 has been configured with MAC address DM1 (Primary) correspondent to IP address DIP (Default Gateway IP address for subnet IP0), DM2 (Backup) correspondent to IP address DIP (Default Gateway IP address for subnet IP0), an DM3 (Backup) correspondent to IP address DIP (Default Gateway IP address for subnet IP0). In order to provide a second DRG, LEC #2 324 has been configured with MAC address DM2 (Primary) correspondent to IP address DIP (Default Gateway IP address for subnet IP0), DM1 (backup) correspondent to IP address DIP (Default Gateway IP address for subnet IP0), and DM3 (Backup) correspondent to IP address DIP (Default Gateway IP address for subnet IP0). In order to provide a third DRG, LEC #3 326 has been configured with MAC address DM3 (Primary) correspondent to IP address DIP (Default Gateway IP address for subnet IP0), DM1 (backup) correspondent to IP address DIP (Default Gateway IP address for subnet IP0), and DM2 (Backup) correspondent to IP address DIP (Default Gateway IP address for subnet IP0).

In order to demonstrate how the DRGs function (i.e., how the gateway function for subnet IP0 is distributed), shown are three groups of LE Clients 352, 354, and 356 (a "group" could consist of just one LE Client; furthermore, it is to be understood that three groups are merely exemplary, and in reality any number of groups are possible). But for the present invention, all LE Clients within Groups of LE Clients 352, 354, and 356 would utilize a single default IP gateway/MAC pairing when an IP station is transmitting to another IP station connected to an IP subnet other than IP0. However, in one embodiment of the present invention the single default IP gateway has been paired with three different MAC addresses distributed across the three different LECs 322, 324, and 326, and each LE Client within Groups of LE Clients 352, 354, and 356 have been configured to reach the default IP gateway address through DM1, DM2, and DM3 respectively.

Lan Emulation Server (LES) 330 only allows one unique DRG IP/MAC address pairing to be active within any one LEC at any one time. Consequently, if all DRG primary MAC addresses are active, it can be seen that the system shown effectively distributes the loading associated with the default IP gateway for subnet IP0 across several different network nodes. That is, the scheme shown in FIG. 3 will allow Router #1 312 to serve as default IP gateway for the IP stations associated with LE Clients in LE Client group 352, Router #2 314 to serve as that same default IP gateway for the IP stations associated with LE Clients in LE Client group 354, and Router #3 316 to serve as that same default IP gateway for the IP stations associated with LE Clients in LE Client group 356. Furthermore, in order to assure effective load balancing the system randomly distributes clients across active DRGs, in a fashion described below.

In the embodiment shown in FIG. 3, all configured DRGs in a subnet provide routing support for the entire subnet, although each client in the subnet uses only one DRG at a time. If a DRG primary MAC pairing within LEC #1 322, LEC #2 324, or LEC #3 326 goes down, the system responds such that a correspondent DRG backup MAC is activated within one of the still-active LECs. Consequently, the system responds such that the clients of the "down" DRG are automatically transferred to another DRG within a still active LEC.

Figure 4:
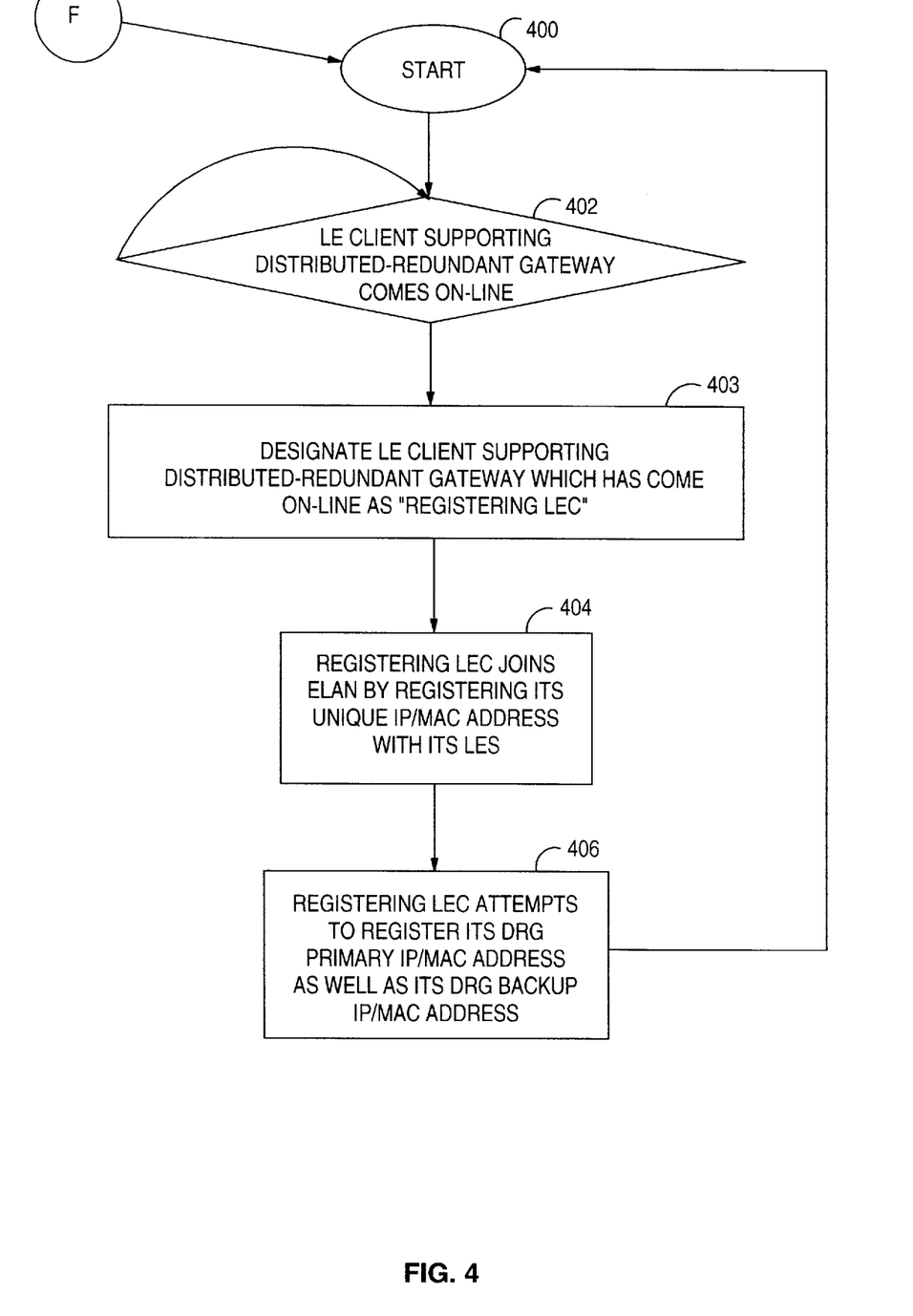
FIG. 4 is a high-level logic flowchart that depicts how the distributed-redundant gateways (DRG) on the emulated LAN (ELAN) embodiment of FIG. 3 are configured and maintained.

Refer now to FIG. 4. FIG. 4 is a high-level logic flowchart that depicts how the distributed-redundant gateways (DRG) on the emulated LAN (ELAN) embodiment of FIG. 3 are configured and maintained.

Method step 400 depicts the start of the process. Method step 402 illustrates the inquiry as to whether a LAN Emulation Client (LEC) supporting DRG (e.g. any one of LECs 322, 324, and 326) has come up (online). In the event that no LEC supporting DRG has come up, the process returns to method step 402. However, in the event that an LEC supporting DRG has come up, the process proceeds to method step 403. Method step 403 illustrates that the LEC supporting DRG which has come up is designated as "registering LEC." (For sake of illustration will be assumed to be LEC 322 has come up; however, it is to be understood that any LEC supporting DRG would initiate the process described herein.)

In the embodiment shown in FIG. 3, all configured DRGs in a subnet provide routing support for the entire subnet, although each client in the subnet uses only one DRG at a time. If a DRG primary MAC pairing within LEC #1 322, LEC #2 324, or LEC #3 326 goes down, the system responds such that a correspondent DRG backup MAC is activated within one of the still-active LECs. Consequently, the system responds such that the clients of the "down" DRG are automatically transferred to another DRG within a still active LEC.

Refer now to FIG. 4. FIG. 4 is a high-level logic flowchart that depicts how the distributed-redundant gateways (DRG) on the emulated LAN (ELAN) embodiment of FIG. 3 are configured and maintained.

Method step 400 depicts the start of the process. Method step 402 illustrates the inquiry as to whether a LAN Emulation Client (LEC) supporting DRG (e.g. any one of LECs 322, 324, and 326) has come up (online). In the event that no LEC supporting DRG has come up, the process returns to method step 402. However, in the event that an LEC supporting DRG has come up, the process proceeds to method step 403. Method step 403 illustrates that the LEC supporting DRG which has come up is designated as "registering LEC." (For sake of illustration will be assumed to be LEC 322 has come up; however, it is to be understood that any LEC supporting DRG would initiate the process described herein.)

Method step 404 shows a LEC joining ELAN 310 by registering its unique IP/MAC address (e.g., IP1/M1 for LEC 322) with LES 330[1]. Thereafter, method step 406 depicts that registering LEC (e.g., LEC 322) will attempt to register its primary DRG IP/MAC address (e.g., DIP/DM1 (Primary) for LEC 322) as well as all backup DRG IP/MAC addresses (e.g., DIP/DM2 (Backup) and DIP/DM3 (Backup) for LEC 322) with LES 330; the process by which method step 406 is achieved is discussed in detail in FIGS. 5A and 5B, below.

[1]Throughout the application, there are many references to the registration of an IP/MAC address with a LES. The IP address is never registered; only the MAC address is registered with the LES. But since each MAC is mapped to an IP address, the text always mentions both. This helps to convey the ideas behind the invention. Restated, throughout this document, text describing an IP/MAC pairing may be referenced to more accurately convey the general processes associated with the described invention. The combination of an IP and a MAC address is used to uniquely identify a single object, since describing the object by its MAC or IP address alone may be too vague. In the example for which an IP/MAC address is registered with the LES, only the MAC address is actually registered, but the IP/MAC naming convention is kept to clearly identify which client is registering.

Subsequent to registration, the process returns to method step 400 and proceeds to method step 402 wherein it will cycle until another LEC supporting DRG comes up, or online.

Figure 5A:
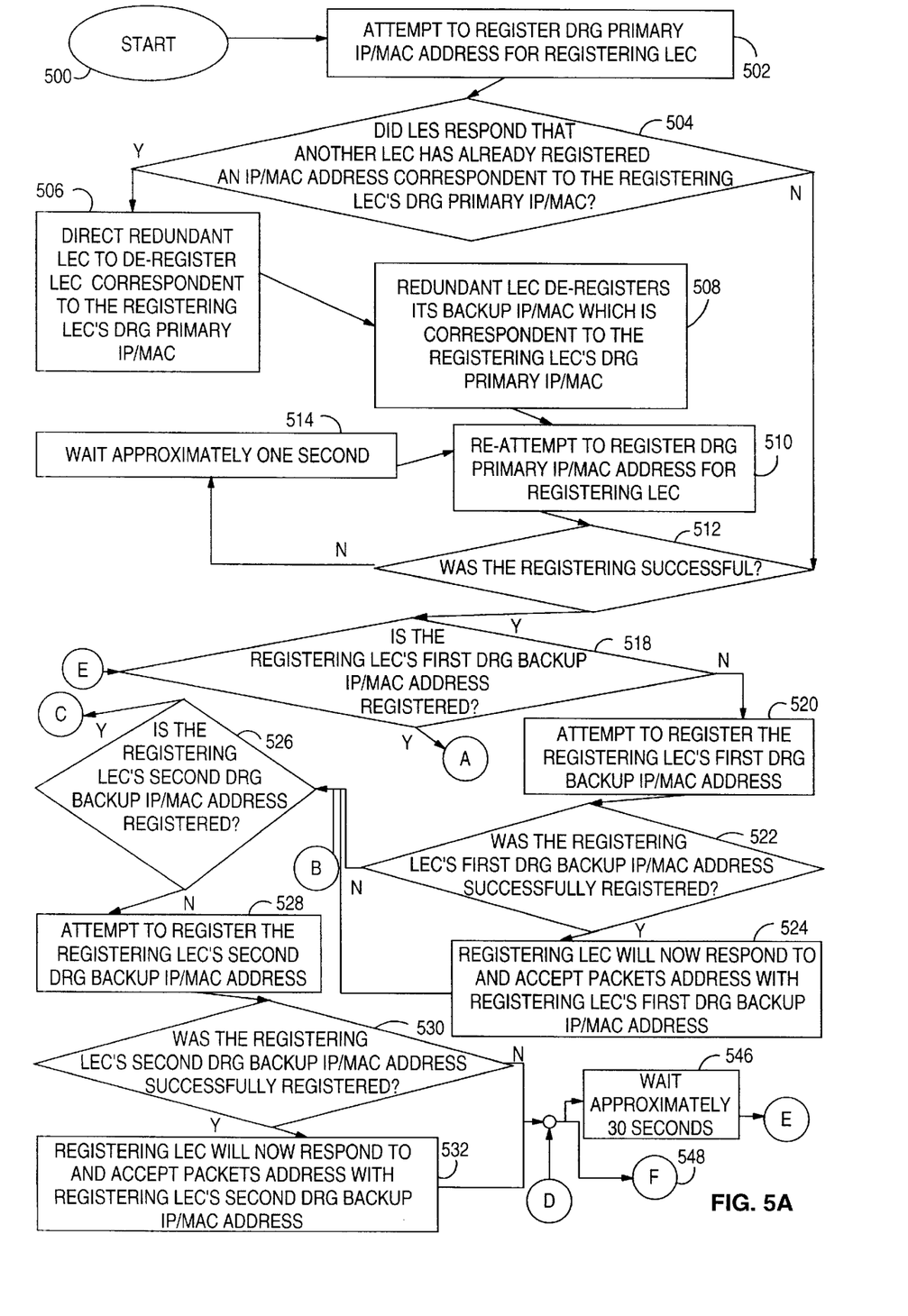
FIGS. 5A and 5B show the process whereby the registering LEC attempts to register its DRG primary and backup Internet Protocol/Medium Access Control (IP/MAC) addresses.
Figure 5B:
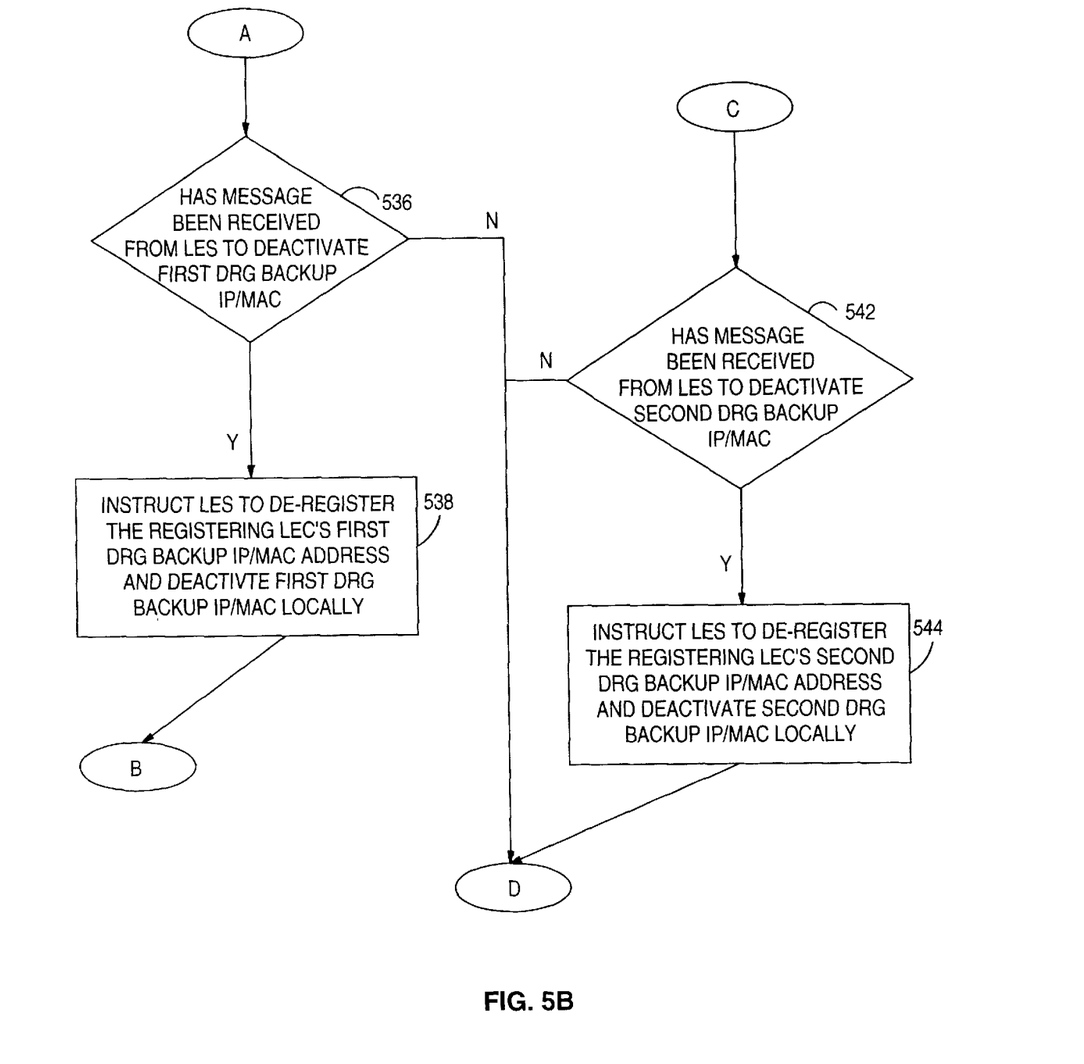

Refer now to FIGS. 5A and 5B. FIGS. 5A and 5B show the process whereby the registering LEC attempts to register its DRG primary and backup IP/MAC addresses. Method step 500 shows the start of the process. Method step 502 depicts an attempt to register the DRG primary IP/MAC address (e.g., DIP/M1 for LEC 322) for the registering LEC. Method step 504 depicts the inquiry as to whether LES 330 has responded to the attempt to register the DRG primary MAC with a message that another LEC (e.g., LEC 324 or 326 when LEC 322 is the registering LEC) has already registered an IP/MAC address correspondent to the DRG primary IP/MAC address for the registering LEC). If no other LEC has registered an IP/MAC address correspondent to the Registering LEC's DRG primary IP/MAC address, the process proceeds to method step 512.

If another LEC has already registered the DRG primary IP/MAC address (e.g., another LEC has registered it DRG backup IP/MAC address correspondent to the registering LEC's DRG primary IP/MAC address), then the process proceeds to method step 506 wherein it is shown that the registering LEC sends a message to the LEC that currently has the MAC address registered using a private protocol[2]; the message informs the redundant LEC that the registering LEC is configured with the DRG primary IP/MAC address is ready to assume the gateway role for IP clients using that DRG primary IP/MAC address. Thereafter, method step 508 depicts that upon receipt of the message, the redundant LEC unregisters its DRG backup IP/MAC address which is correspondent to the registering LEC's DRG primary IP/MAC address.

[2]The private protocol's messages are similar to the LANE LE_FLUSH request messages. In fact, messages of this private protocol take the same route to the LEC as LE_FLUSH request messages. The private protocol's messages are identical to the LE_FLUSH messages in every way, even opcode, except that the source LAN destination and target LAN destination fields are equal to the primary MAC address of the DRG.

Method step 510 shows that the registering LEC retries registration of its DRG primary IP/MAC address. Thereafter, method step 512 depicts the inquiry as to whether the registration was successful. In the event that the registration was not successful, the process proceeds to method step 514, waits approximately one second, and then proceeds to method step 510 (or, alternatively, the process could proceed to method step 508, as shown by the dashed line). In the event the process was successful, the process proceeds to method step 518.

As can be seen by reference to FIG. 3, LECs supporting DRG have more than one IP address: one maps to the configured LEC's MAC address and other IP addresses map to primary and backup DRG MAC addresses. The LECs only process packets sent to the IP address over the LAN Emulation multicast path with a DRG IP/MAC address which the LECs have successfully registered with LES 330. That is, a LEC will only process packets received on the LAN Emulation Multicast Send Virtual-Channel Connection (VCC) or Multicast Forward VCC for a particular DRG IP/MAC address when that particular LEC has registered the DRG IP/MAC (primary or backup) with LES 310. Packets received by a DRG sent over a LAN Emulation Data Direct VCC are always processed by the DRG, provided the packet's destination MAC address matches one of the configured DRG MAC addresses. The MAC address need not be registered with the LES (e.g., LES 330) for the DRG to process a packet received over a data direct LAN Emulation data forwarding path. Consequently, a mechanism is necessary to ensure that DRG backup MACs become registered in the event that a LEC responsible for a DRG primary IP/MAC address goes down (LES 330 monitors the DRG primary IP/MACs, and when support for a DRG primary IP/MAC goes down LES 330 immediately deregisters that DRG primary MAC). This eventuality is provided for as follows.

Method step 518 depicts the inquiry as to whether the registering LEC's first DRG backup MAC is registered. In the event that the registering LEC's first DRG backup MAC is not registered, method step 520 shows that an attempt is made to register the registering LEC's first DRG backup IP/MAC (e.g., IP/M2 for LEC #1 322) with LES 330. Method step 522 depicts the inquiry as to whether the registering LEC's first DRG backup MAC was successfully registered. If the first DRG backup MAC was not successfully registered, the process proceeds to method step 526. If the first DRG backup MAC was successfully registered, method step 524 illustrates that the registering LEC will begin to respond to and accept packets addressed to the first DRG backup IP/MAC address, since that DRG backup IP/MAC address is now active. Thereafter, the process proceeds to method step 526.

Method step 526 depicts the inquiry as to whether the registering LEC's second DRG backup IP/MAC address is registered. In the event that the registering LEC's second DRG backup IP/MAC address is not registered, the process proceeds to method step 528. Method step 528 shows that an attempt is made to register the registering LEC's second DRG backup IP/MAC address (e.g., IP/M3 for LEC #1 322) with LES 330. Method step 530 depicts the inquiry as to whether the registering LEC's second DRG backup IP/MAC address was successfully registered. If the registering LEC's second DRG backup IP/MAC address was not successfully registered, the process simultaneously proceeds to method steps 546 and 548. If the registering LEC's second DRG backup IP/MAC address was successfully registered, method step 532 illustrates that the registering LEC will begin to respond to and accept packets addressed to the registering LEC second DRG backup IP/MAC address, since that DRG backup IP/MAC address is now active. Thereafter, the process simultaneously proceeds to method steps 546 and 548.

In the event that the registering LEC's first DRG backup IP/MAC address is registered, method step 536 illustrates that inquiry is made as to whether a message has been received from LES 330 to deactivate the first DRG backup IP/MAC address. If such a message has been received (e.g., such as when the LEC having a primary IP/MAC address corresponding to the registering LEC's first DRG backup MAC has sent a message to deactivate it), the process proceeds to method step 538 wherein it is shown that LES 330 is instructed to deactivate the registering LEC's first DRG backup IP/MAC address and wherein it is shown that the registering LEC will no longer respond to packets addressed to its first DRG backup IP/MAC address. Thereafter, the process proceeds to method step 526.

In the event that the registering LEC's second DRG backup IP/MAC address is registered, method step 542 illustrates that inquiry is made as to whether a message has been received from LES 330 to deactivate the second DRG backup IP/MAC address. If such a message has been received (e.g., such as when the LEC having a second IP/MAC address corresponding to the first DRG backup MAC has sent a message to deactivate it), the process proceeds to method step 544 wherein it is shown that LES 330 is instructed to deactivate the second DRG backup IP/MAC address and wherein it is shown that the LEC will no longer respond to packets addressed to its second DRG backup IP/MAC address. Thereafter, the process proceeds to method step 542.

Method step 546 depicts a 30 second wait, after which time the process proceeds to method step 518.

In addition to the forgoing step, the process also proceeds to method step 548, which shows the placement of the process back into the flow of FIG. 4. Thus, FIG. 5, shows that the process returns to FIG. 4, while simultaneously leaving a process of FIG. 5 running whereby the status of the DRG backup MACs for the registering LEC are constantly checked and updated, thereby assuring that backup for the system is efficiently provided.

Note that since each LEC provides routing support for the same default gateway IP address via its active DRG MAC addresses, LE Clients in LE Client groups 312, 314, and 316 must learn a DRG IP/MAC to associate with those LE Clients in each LE Client group 312, 314, and 316. It has been found that by randomly assigning clients to DRGs, each DRG will handle the routing for similar number of clients. This effectively distributes the routing workload across multiple DRGs containing a single default gateway IP address for the subnet, thus simplifying client administration.

Figure 6:
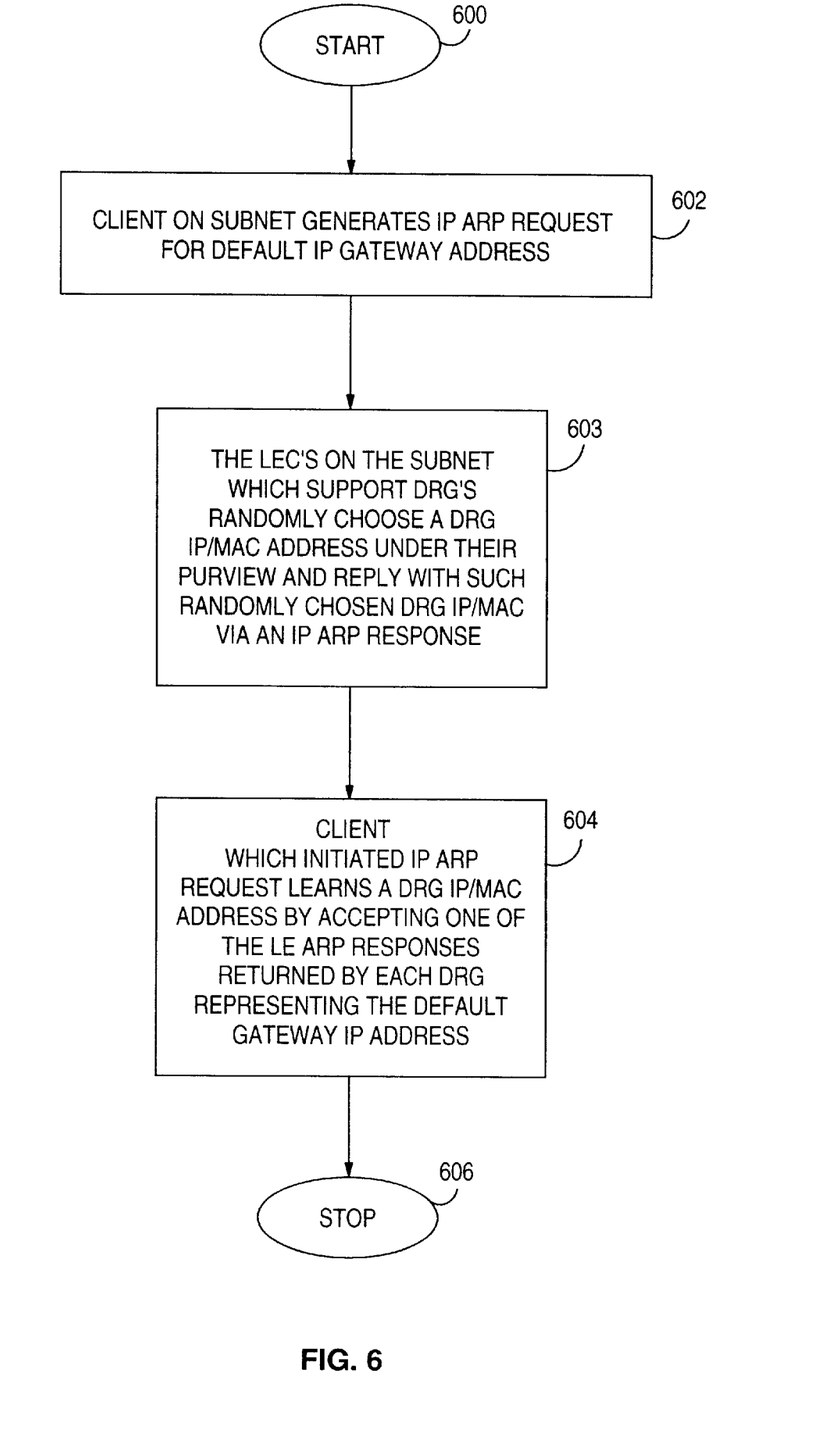
FIG. 6 depicts a high-level logic flowchart which illustrates the process by which LE Client groups 312, 314, and 316 are constructed in one embodiment of the present invention.

Refer now to FIG. 6. FIG. 6 depicts a high-level logic flowchart which illustrates the process by which LE Client groups 312, 314, and 316 are constructed in one embodiment of the present invention. Method step 600 shows the start of the process. Method step 602 depicts the event of an LE Client on subnet 310 generating an IP ARP request for a default gateway IP address for the subnet. Method step 603 depicts that in response to the IP ARP request for the default gateway IP address of a subnet, the LECs which support DRGs, in order to insure even distribution of DRG MAC addresses across all clients in the subnet, reply to IP ARP requests for the default IP gateway by randomly selecting one of the DRG MAC addresses assigned to the LECs; it is not necessary for the DRG IP/MAC address to be active at the LEC for the LEC to send the DRG in response to the IP ARP Request, since in this process the idea is just to randomize the distribution of the DRG IP/MAC addresses across the subnet. Furthermore, the state of the DRG is not important when replying to an IP ARP request, since it is assumed that every DRG IP/MAC address is active and registered by one DRG at all times. Thus, by randomizing the responses, the system makes more likely that LE Client groups 312, 314, and 316 will be evenly distributed among the active DRGs.

Method step 604 depicts that the LE Client which initiated the IP ARP Request learns a random default gateway MAC address by accepting as its DRG IP/MAC address for the default gateway that indicated in the last received IP ARP Response. Although, the specific IP ARP Response the client uses to learn the DRG MAC address to default gateway IP address mapping is irrelevant, since every DRG replies to the IP ARP Request with a randomly selected configured DRG MAC address (i.e., since the DRG response is random, it is not absolutely essential that the last received response be the one utilized).

Subsequent to method step 606, the process proceeds to method step 608 and stops.

While the invention has been particularly shown and described with reference to a preferred embodiment, it will be understood by those skilled in the art that various changes in form and detail may be made therein without departing from the spirit and scope of the invention as such is set forth in the appended claims.

We claim:

1. A method for improving communications in data communications networks which provide network emulation, said method comprising the steps of:

configuring each of a plurality of independent routers of said data communications network with a set of at least two distributed gateways, wherein a first distributed gateway of said set operates as a primary gateway with respect to a given one of said routers, and all other gateways of said set serve as backup gateways with respect to said given router, wherein further said primary gateway serves as a backup gateway with respect to a next router of said plurality of independent routers and one of said backup gateways serve as a primary gateway with respect to said next router; and dynamically assigning one gateway of said set of at least two distributed gateways to provide a connection between a LAN emulation client (LEC) and said data communications network, wherein said primary gateway is assigned when available and one of said backup gateways is assigned when said primary gateway is unavailable.

2. The method of claim 1, wherein said step of configuring further includes the step of implanting said all other gateways of said set as a plurality of distributed-redundant gateways having auxiliary IP/MAC addresses in at least one Asynchronous Transfer Mode (ATM) Emulated Local Area Network (ELAN).

3. The method of claim 2, wherein an equal number of said plurality of independent routers and said distributed gateways are present, and wherein further said configuring step further includes the steps of:

associating a first distributed-redundant gateway with a first LAN Emulation Client (LEC) in the at least one ATM ELAN, said first distributed-redundant gateway being a primary gateway of a second LEC; and associating a second distributed-redundant gateway in said second LAN Emulation Client (LEC) of the at least one ATM ELAN, wherein said second distributed-redundant gateway is a primary gateway of said first LEC.

4. The method of claim 3, wherein said step of associating a first distributed-redundant gateway in a first LAN Emulation Client (LEC) of the at least one ATM ELAN further includes the step of associating a first distributed-redundant Internet Protocol (IP) gateway in a first LAN Emulation Client (LEC) of the at least one ATM ELAN.

5. The method of claim 3, wherein said step of associating a second distributed-redundant gateway in a second LAN Emulation Client (LEC) of the at least one ATM ELAN further includes the step of implanting a second distributed-redundant Internet Protocol (IP) gateway in a second LAN Emulation Client (LEC) of the at least one ATM ELAN.

6. The method of claim 1, wherein said step of dynamically assigning access to operational distributed-redundant gateways further includes the step of said operational distributed-redundant gateways assuming duties of inoperational distributed-redundant gateways.

7. The method of claim 6, wherein said step of said operational distributed-redundant gateways assuming duties of said inoperational distributed-redundant gateways further includes the step of operational distributed-redundant gateways intermittently attempting to assume the responsibilities of other distributed-redundant gateways.

8. The method of claim 7, wherein said step of operational distributed-redundant gateways intermittently attempting to assume the responsibilities of other distributed-redundant gateways further comprises the steps of intermittently attempting to register at least one Internet Protocol/Media Access Control address with a LAN Emulation Server associated with the ATM ELAN.

9. The method of claim 1, wherein said step of dynamically assigning step further includes the steps of:

creating at least one pool of Clients for each operational distributed-redundant server; and directing each Client within each pool to utilize a specific operational distributed-redundant gateway.

10. The method of claim 9, wherein said at least one pool of Clients further includes least one pool of ATM ELAN Clients and wherein said step of creating at least one pool of Clients for each operational distributed-redundant gateway further includes the steps of:

instructing each ATM Emulated LAN Client performing a distributed-redundant gateway function to respond to an LAN Emulation address Resolution Protocol (LE ARP) Request for a default gateway with an IP/MAC address selected from a set of IP/MAC address making up a given distributed-redundant gateway; and instructing at least one LE Client to utilize as its default gateway an LE ARP Response to said LE ARP Request for a default gateway.

11. A system for improving communications in data communications networks which provide network emulation, said system comprising:

means for configuring each of a plurality of independent routers of said data communications network with a set of at least two distributed gateways, wherein a first distributed gateway of said set operates as a primary gateway with respect to a given one of said routers, and all other gateways of said set serve as backup gateways with respect to said given router, wherein further said primary gateway serves as a backup gateway with respect to a next router of said plurality of independent routers and one of said backup gateways serve as a primary gateway with respect to said next router; and means for dynamically assigning one gateway of said set of at least two distributed gateways to provide a connection between a LAN emulation client (LEC) and said data communications network, wherein said primary gateway is assigned when available and one of said backup gateways is assigned when said primary gateway is unavailable.

12. The system of claim 11, wherein said means for configuring further includes means for implanting said all other gateways of said set as a plurality of distributed-redundant gateways having auxiliary IP/MAC addresses in at least one Asynchronous Transfer Mode (ATM) Emulated Local Area Network (ELAN).

13. The system of claim 12, wherein an equal number of said plurality of independent routers and said distributed gateways are present, and wherein further said configuring means further includes:

means for associating a first distributed-redundant gateway with a first LAN Emulation Client (LEC) in the at least one ATM ELAN, said first distributed-redundant gateway being a primary gateway of a second LEC; and means for associating a second distributed-redundant gateway in said second LAN Emulation Client (LEC) of the at least one ATM ELAN, wherein said second distributed-redundant gateway is a primary gateway of said first LEC.

14. The system of claim 13, wherein said means for associating a first distributed-redundant gateway in a first LAN Emulation Client (LEC) of the at least one ATM ELAN further includes means for associating a first distributed-redundant Internet Protocol (IP) gateway in a first LAN Emulation Client (LEC) of the at least one ATM ELAN.

15. The system of claim 13, wherein said means for associating a second distributed-redundant gateway in a second LAN Emulation Client (LEC) of the at least one ATM ELAN further includes means for implanting a second distributed-redundant Internet Protocol (IP) gateway in a second LAN Emulation Client (LEC) of the at least one ATM ELAN.

16. The system of claim 11, wherein said means for dynamically assigning access to operational distributed-redundant gateways further includes means for said operational distributed-redundant gateways to assume duties of inoperational distributed-redundant gateways.

17. The system of claim 16, wherein said means for said operational distributed-redundant gateways assuming duties of said inoperational distributed-redundant gateways further includes means for operational distributed-redundant gateways to intermittently attempt to assume the responsibilities of other distributed-redundant gateways.

18. The system of claim 17, wherein said means for operational distributed-redundant gateways to intermittently attempt to assume the responsibilities of other distributed-redundant gateways further comprises means for intermittently attempting to register at least one Internet Protocol/Media Access Control address with a LAN Emulation Server associated with the ATM ELAN.

19. The system of claim 11, wherein said dynamically assigning means further includes:

means for creating at least one pool of Clients for each operational distributed-redundant server; and means for directing each Client within each pool to utilize a specific operational distributed-redundant gateway.

20. The system of claim 19, wherein said at least one pool of Clients further includes at least one pool of ATM ELAN Clients, and wherein said means for creating at least one pool of Clients for each operational distributed-redundant gateway further includes:

means for instructing each ATM Emulated LAN Client performing a distributed-redundant gateway function to respond to an LAN Emulation Address Resolution Protocol (LE ARP) Request for a default gateway with an IP/MAC address selected from a set of IP/MAC addresses making up a given distributed-redundant gateway; and means for instructing at least one LE Client to utilize as its default gateway an LE ARP Response to said LE ARP Request for a default gateway.

* * * * *